US010933781B2

(12) United States Patent
Yang et al.

(10) Patent No.: US 10,933,781 B2
(45) Date of Patent: Mar. 2, 2021

(54) TRIM COVER FOR A SEAT BELT BUCKLE HOLE

(71) Applicant: LEAR CORPORATION, Southfield, MI (US)

(72) Inventors: Yong Yang, Shanghai (CN); Jianying Gu, Shanghai (CN); Wenjuan Yang, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/406,968

(22) Filed: May 8, 2019

(65) Prior Publication Data

US 2019/0351796 A1 Nov. 21, 2019

(30) Foreign Application Priority Data

May 15, 2018 (CN) ........................ 201810462566.4

(51) Int. Cl.

*B60N 2/58* (2006.01)
*B60N 2/68* (2006.01)
*B60R 22/18* (2006.01)

(52) U.S. Cl.

CPC ............... *B60N 2/58* (2013.01); *B60N 2/688* (2013.01); *B60R 2022/1806* (2013.01)

(58) Field of Classification Search

CPC ........ B60N 2/58; B60N 2/688; B60R 21/207; B60R 21/215; B60R 2022/1806; B60R 2022/1843

See application file for complete search history.

(56) References Cited

U.S. PATENT DOCUMENTS

| | | | | | |
|---|---|---|---|---|---|
| 4,400,015 | A * | 8/1983 | Ryu | B60R 22/22 280/807 |
| 5,139,311 | A * | 8/1992 | Imai | B60R 22/02 297/481 |
| 5,544,917 | A * | 8/1996 | Loxton | B60R 22/26 280/801.2 |
| 5,716,073 | A * | 2/1998 | Redman | B60R 22/26 280/801.1 |
| 7,635,167 | B2 * | 12/2009 | Okazaki | B60N 2/688 280/808 |
| 7,648,208 | B2 * | 1/2010 | Weinstein | B60R 22/18 297/481 |
| 7,699,396 | B2 * | 4/2010 | Ghisoni | B60N 2/2887 297/253 |
| 8,016,318 | B2 * | 9/2011 | Nezaki | B60N 2/688 280/733 |
| 8,302,994 | B2 | 11/2012 | Ko | |
| 8,727,449 | B2 | 5/2014 | Laframboise et al. | |
| 8,820,790 | B2 * | 9/2014 | Wenz | B60N 2/688 280/808 |

(Continued)

FOREIGN PATENT DOCUMENTS

JP 2010064639 A 3/2010

*Primary Examiner* — Philip F Gabler
(74) *Attorney, Agent, or Firm* — Brooks Kushman P.C.

(57) ABSTRACT

A seat belt buckle housing trim assembly includes a retaining frame having an attachment surface that extends about an inner aperture, at least one trim wall secured to the attachment surface and extending through the inner aperture, and a plurality of trim covers secured to the attachment surface and extending across at least a portion of the inner aperture.

20 Claims, 4 Drawing Sheets

(56) References Cited

U.S. PATENT DOCUMENTS

| | | | | |
|---|---|---|---|---|
| 9,114,741 | B2 * | 8/2015 | Nagata | B60N 2/682 |
| 9,156,434 | B2 * | 10/2015 | Erayan | B60R 22/18 |
| 9,457,765 | B2 | 10/2016 | Ashtekar et al. | |
| 9,592,750 | B2 * | 3/2017 | Asaeda | B60N 2/7017 |
| 9,738,183 | B2 * | 8/2017 | Szlag | B60N 2/58 |
| 10,486,566 | B2 * | 11/2019 | Namboodiri | B60N 2/688 |
| 2013/0093233 | A1 * | 4/2013 | Kajihara | B60N 2/58<br>297/452.38 |
| 2017/0355283 | A1 * | 12/2017 | Shindo | B60N 2/58 |
| 2019/0106079 | A1 * | 4/2019 | Ohno | B60N 2/42 |

* cited by examiner

TRIM COVER FOR A SEAT BELT BUCKLE HOLE

CROSS-REFERENCE TO RELATED APPLICATIONS

This application claims foreign priority benefits under 35 U.S.C. § 119(a)-(d) to CN 2018 104 625 66.4, filed May 15, 2018, the disclosure of which is hereby incorporated by reference in its entirety.

TECHNICAL FIELD

The present disclosure relates to a vehicle seat having a trim cover for a seat belt buckle hole.

BACKGROUND

Vehicle seat assemblies often include a seat bottom secured to a seat frame. A seat belt buckle may extend upwardly through the seat bottom within a buckle housing that may be defined by the seat bottom. When the seat belt buckle is moved (e.g., forward or backward) within the buckle housing, under-seat components may be visually perceptible through the buckle housing.

SUMMARY

In at least one approach, a seat belt buckle housing trim assembly is provided. The seat belt buckle housing trim assembly may include a retaining frame, at least one trim wall, and a plurality of trim covers. The retaining frame may have an attachment surface that may extend about an inner aperture. The at least one trim wall may be secured to the attachment surface and may extend through the inner aperture. The plurality of trim covers may be secured to the attachment surface and may extend across at least a portion of the inner aperture.

In at least one approach, a seating assembly for a vehicle is provided. The seating assembly may include a seat bottom that may include a lower surface, an upper surface, and a seat belt buckle housing that extends from the lower surface to the upper surface. The seating assembly may further include a seat belt buckle that may extend within the seat belt buckle housing. The seating assembly may further include a buckle housing trim assembly. The buckle housing trim assembly may include a retaining frame disposed at the lower surface and defining an inner aperture, and at least one trim wall extending from the retaining frame, through the seat belt buckle housing, and to the upper surface. The buckle housing trim assembly may further include at least one trim cover secured to the retaining frame and extending across at least a portion of the inner aperture.

In at least one approach, a method of assembling seat belt buckle housing trim assembly is provided. The method may include securing at least one trim wall to an attachment surface of a retaining frame having a plurality of inner edges defining an inner aperture. The method may further include securing a first trim cover to the retaining frame at a first inner edge and at a second inner edge adjacent to the first inner edge. The method may further include securing a second trim cover to the retaining frame at the second inner edge and at a third inner edge adjacent to the second inner edge to at least partially overlap the first trim cover. The method may further include securing a third trim cover to the retaining frame at the third inner edge and at a fourth inner edge adjacent to the third inner edge to at least partially overlap the second trim cover. The method may further include securing a fourth trim cover to the retaining frame at the fourth inner edge and at the first inner edge to at least partially overlap the third trim cover and the first trim cover.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
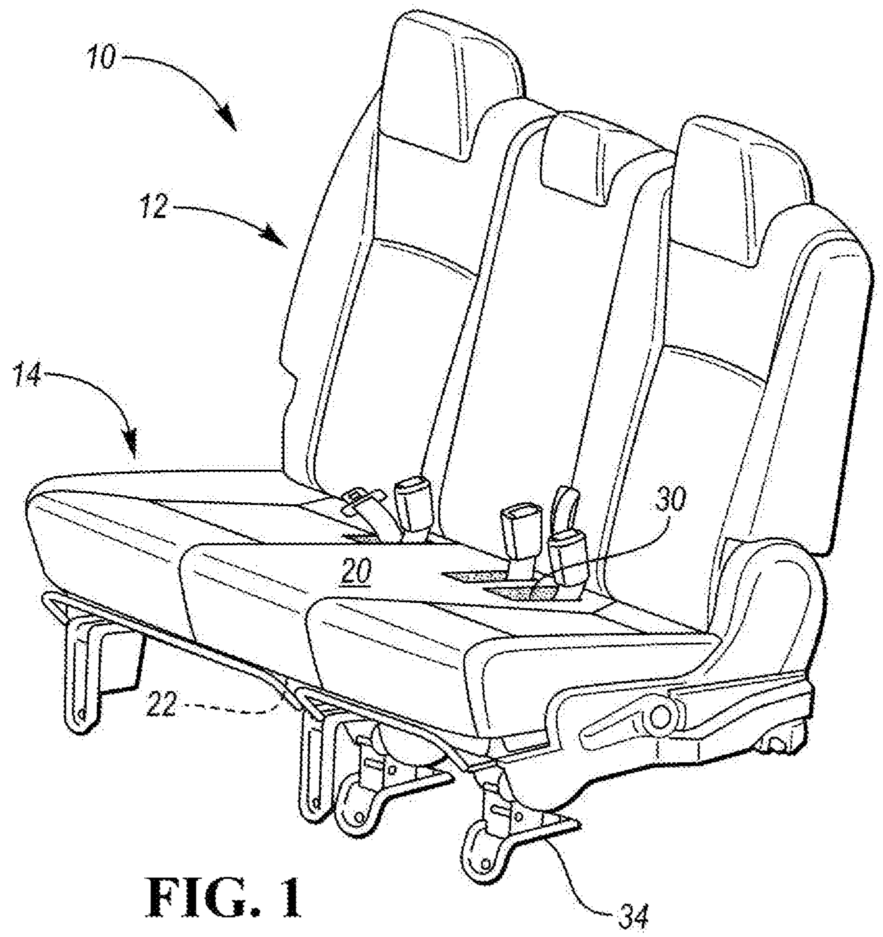
FIG. 1 is a perspective view of a vehicle seat assembly.

Referring to FIG. 1, a vehicle seat assembly, indicated generally at 10, is provided. The seat assembly 10 generally includes one or more seat backs 12 and one or more corresponding seat cushions or bottoms 14. A seat bottom 14 may include an upper surface 20 and a lower surface 22. A trim cover 26 may be disposed about the seat bottom 14; for example, about the upper surface 20.

Figure 2:
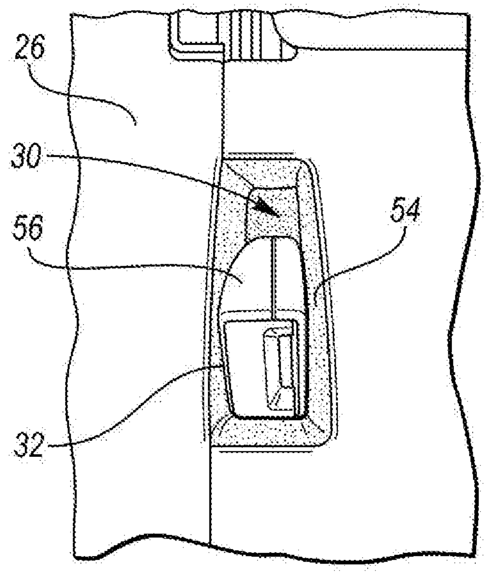
FIG. 2 is a perspective view of a seat belt buckle in a first orientation.
Figure 3:
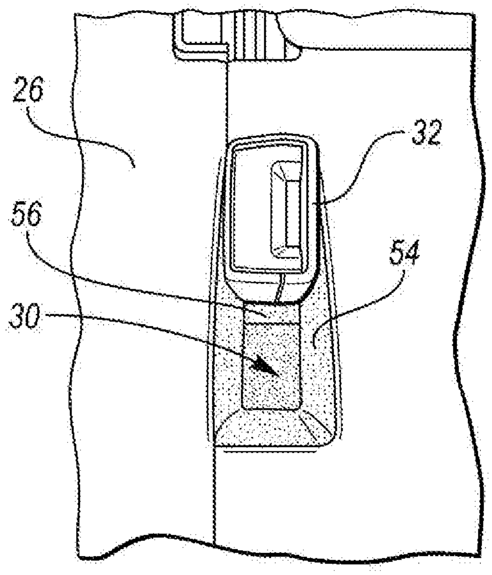
FIG. 3 is a perspective view of the seat belt buckle of FIG. 2 in a second orientation.

Referring to FIGS. 1-4, a seat bottom 14 may define a seat belt buckle housing 30. The seat belt buckle housing 30 may be an aperture, and may extend from the lower surface 22 to the upper surface 20. A seat belt buckle 32 may extend within the seat belt buckle housing 30. The seat belt buckle 32 may extend from an anchor location that may be disposed, for example, at a seat frame 34. The seat belt buckle 32 may be a movable seat belt buckle. For example, the seat belt buckle 32 may be rotatably secured to the seat frame 34. The seat belt buckle 32 may be a flexible seat belt buckle 32. As such, the seat belt buckle 32 may be moveable relative to the seat belt buckle housing 30 between a first position (e.g., as shown in FIG. 2), which may be a forward position, and a second position (e.g., as shown in FIG. 3), which may be a back position.

Figure 4:
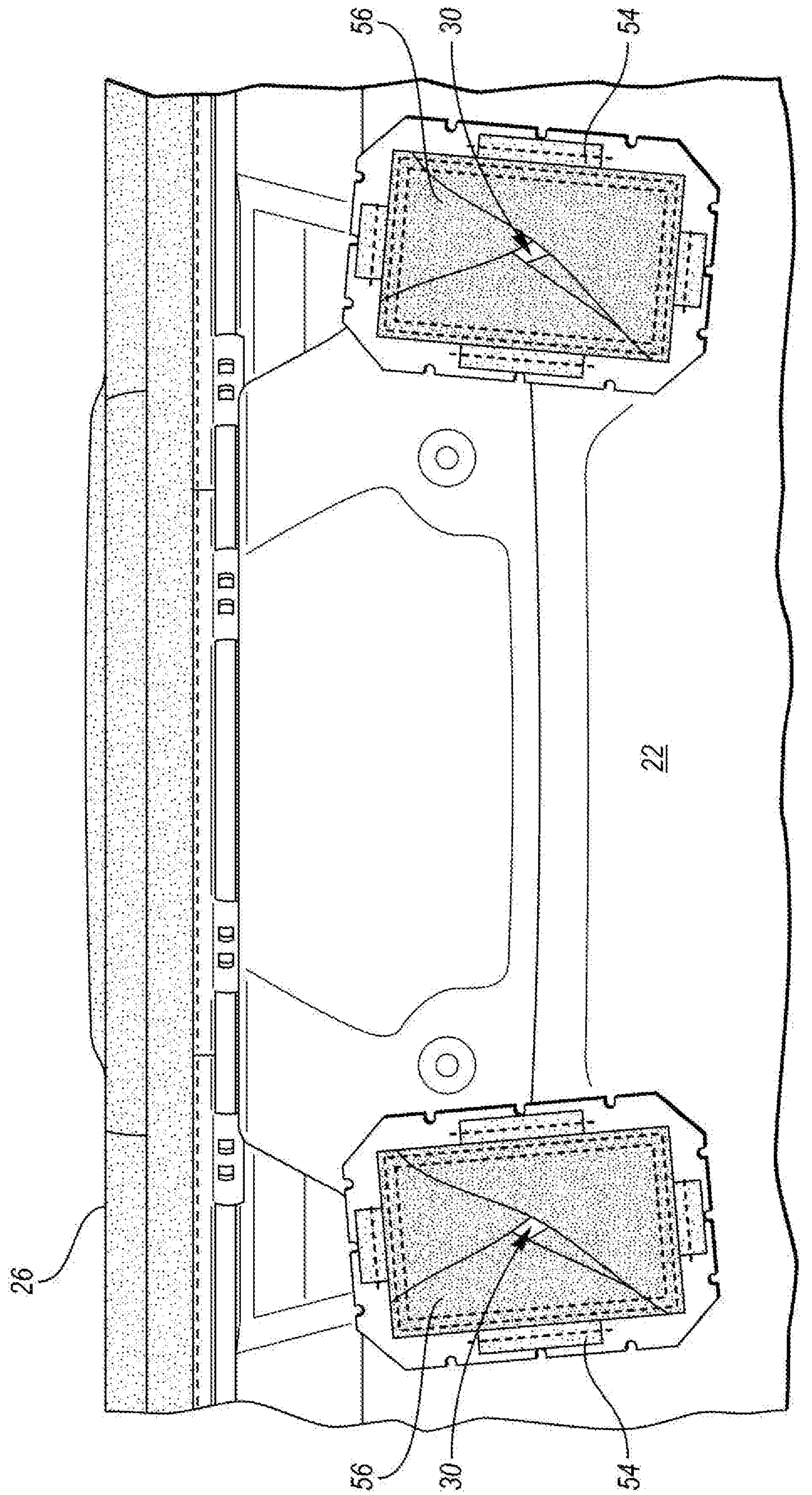
FIG. 4 is a bottom plan view of a seat bottom of the vehicle seat assembly of FIG. 1.
Figure 5:
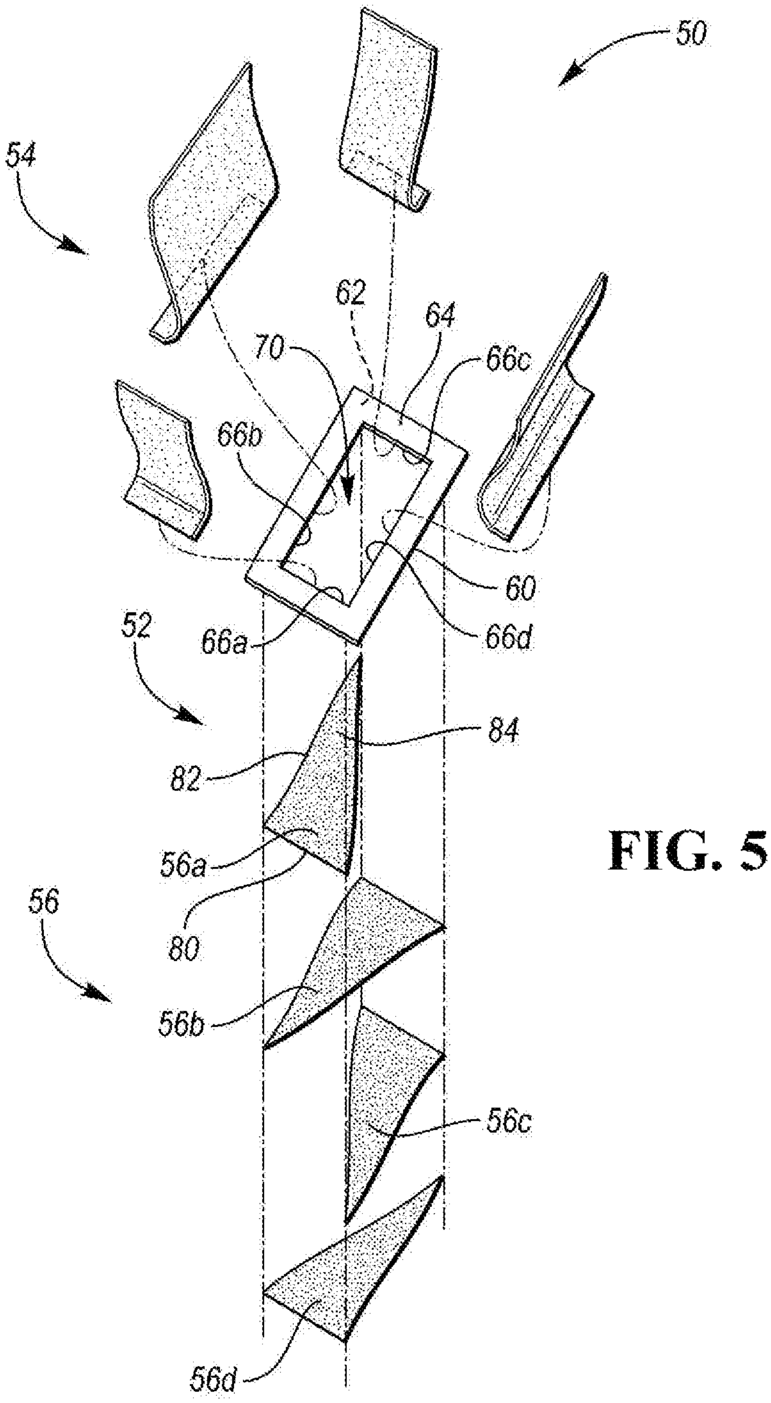
FIG. 5 is an exploded view of a seat belt buckle housing trim assembly.

Referring to FIG. 5, in at least one approach, the seat belt buckle housing 30 may be provided with a buckle housing trim assembly 50. The buckle housing trim assembly 50 may include a retaining frame 52, at least one trim wall 54, and at least one trim cover 56. The retaining frame 52 may be formed of, or may include, a flexible material such that the retaining frame may be resiliently deformable. The retaining frame 52 may be, for example, a plastic retaining frame 52. The retaining frame 52 may have an outer edge 60 that may generally be polygonal. The outer edge 60 may have an outer dimension (e.g., a width and/or a length) that may be greater than a corresponding dimension of the seat belt buckle housing 30 at the bottom surface 24 of the seat bottom 14. In this way, the retaining frame 52 may include a retaining surface 62 that may be disposed at (e.g., against in direct or indirect engagement with) the bottom surface 14 of the seat bottom 14 when the buckle housing trim assembly 50 is installed; for example, as shown in FIG. 4.

The retaining frame 52 may further include an attachment surface 64 that may be disposed opposite the retaining surface 62. The retaining frame 52 may further include one or more inner edges 66 that may define an inner aperture 70. In this way, the retaining surface 62 and/or the attachment surface 64 may extend about the inner aperture 70.

Figure 8:
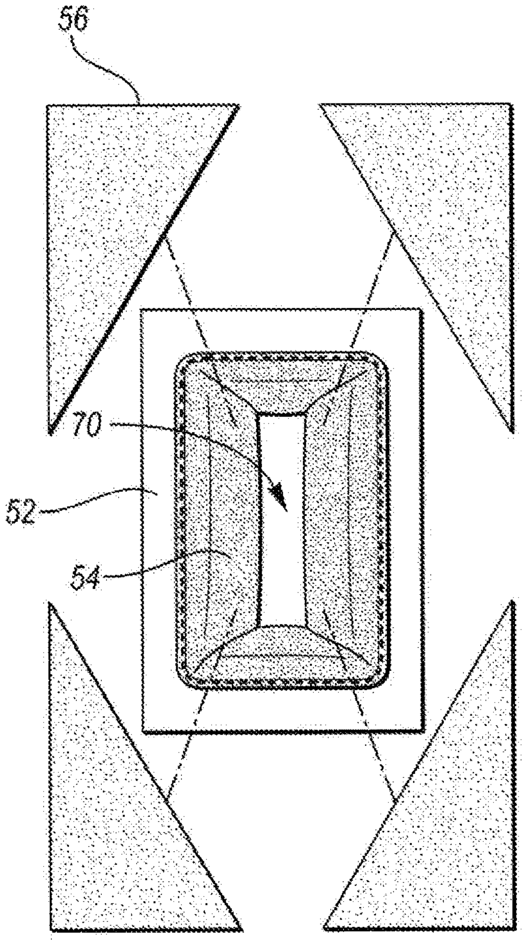
FIG. 8 is a top plan partially exploded view of a seat belt buckle housing trim assembly.

One or more trim walls 54 may be secured to the retaining frame 52. For example, four trim walls 54 may be secured to the attachment surface 64 of the retaining frame 52. The trim walls 54 may extend through the inner aperture 70, as shown, for example, in FIG. 8. The trim walls 54 may extend to the upper surface 20 of the seat bottom 14, and may extend to the trim cover 26, as shown, for example, in FIGS. 2 and 3. In at least one approach, the trim walls 54 may be secured to the trim cover 26. The trim walls 54 may extend in a first direction (e.g., a vertical direction) from the retaining frame 52 when the buckle housing trim assembly 50 is installed in a seat bottom 14. In this way, the trim walls 54 may act to line the vertical walls of the seat belt buckle housing 30.

One or more trim covers 56 may be secured to the retaining frame 52. For example, four trim covers 56 may be secured to the retaining frame 52 at the attachment surface 64 of the retaining frame 52. The trim covers 56 may be secured such that they extend across at least a portion of the inner aperture 70. The trim covers 56 may be formed of, or may include, a flexible fabric.

Figure 6:
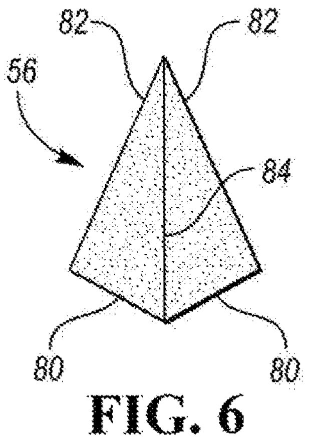
FIG. 6 is a top plan view of a trim cover.
Figure 7:
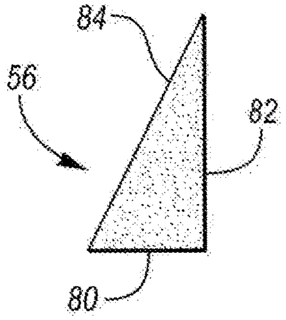
FIG. 7 is a top plan view of the trim cover of FIG. 5 in a folded configuration.

Referring momentarily to FIGS. 6 and 7, an individual trim cover 56 may folded from a first shape to a second shape. For example, the first shape may be a kite shape, as shown in FIG. 6. In this, the trim cover 56 may include a first set of adjacent sides 80 having a first length, and a second set of adjacent sides 82 having a second length that may be greater than the first length. The first shape may be folded to form the second shape. For example, the trim cover 56 may be folded about a fold edge 84. In the folded, second shape, the trim cover 56 may be a triangle, as shown in FIG. 7. More particularly, the triangle may be a right triangle, and more particularly, a scalene triangle. The triangle may be defined by a first side (e.g., which may correspond to sides 80), a second side (which may correspond to sides 82) forming a right angle with the first side, and a hypotenuse (e.g., which may correspond to fold edge 84).

Referring again to FIG. 5, a method of assembling seat belt buckle housing trim assembly may include securing at least one trim wall 54 to the attachment surface 64 of the retaining frame 52, which may have a plurality of inner edges 66*a*, 66*b*, 66*c*, 66*d* defining an inner aperture 70. A first trim cover 56*a* may be secured to the retaining frame 52 at a first inner edge 66*a* and at a second inner edge 66*b* adjacent to the first inner edge 66*a*. In this way, a first edge (e.g., edge 80) of a triangular trim cover may be secured adjacent to a first inner aperture wall 66*a*, a second edge (e.g., edge 82) of the triangular trim cover 56 may be secured adjacent to a second inner aperture wall 66*b*, and a third edge (e.g., edge 84) of the triangular trim cover 56 may extend across the inner aperture 70.

A second trim cover 66*b* may be secured to the retaining frame 52 at the second inner edge 66*b* and at a third inner edge 66*a* adjacent to the second inner edge 66*b* to at least partially overlap the first trim cover 56*a*. A third trim cover 56*c* may be secured to the retaining frame 52 at the third inner edge 66*c* and at a fourth inner edge 66*d* adjacent to the third inner edge 66*c* to at least partially overlap the second trim cover 56*b*. A fourth trim cover 56*d* may be secured to the retaining frame 52 at the fourth inner edge 66*d* and at the first inner edge 66*a* to at least partially overlap the third trim cover 56*c* and the first trim cover 56*a*.

Figure 9:
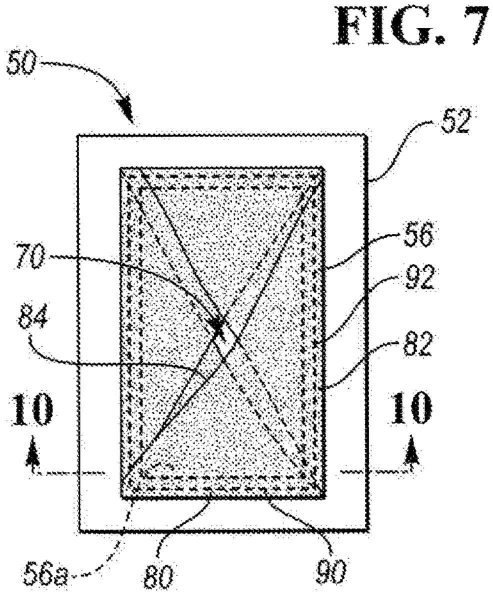
FIG. 9 is a top plan view of the seat belt buckle housing trim assembly of FIG. 8.

In the assembled configuration, shown for example in FIG. 9, two edges of an individual triangular trim cover 56 (e.g., edges 80 and 82) may be secured to the retaining frame 52. Also in the assembled configuration, and a hypotenuse edge (e.g., edge 84) of the triangular trim cover 56 may extend across the inner aperture 70. Also in the assembled configuration, a first seam 90 may secure the first set of adjacent sides 80 together, and a second seam may secure the second set of adjacent sides 82 together. In this configuration, a triangular trim cover 56 may extend across at least a portion of at least one adjacent triangular trim cover 56. In the approach shown, each of the four triangular trim covers 56 extends across at least a portion of at least two adjacent triangular trim covers.

In at least one approach, a triangular trim cover 56 may extend across at least a portion of at least two adjacent triangular trim covers 56. For example, an individual triangular trim cover (e.g., trim cover 56*b*) may overlap a first adjacent triangular trim cover (e.g., trim cover 56*a*) at first side of the individual trim cover 56*b*, and may be overlapped by a second adjacent triangular trim cover (e.g., trim cover 56*c*) at a second side of the individual trim cover 56*b* opposite the first side.

Figure 10:
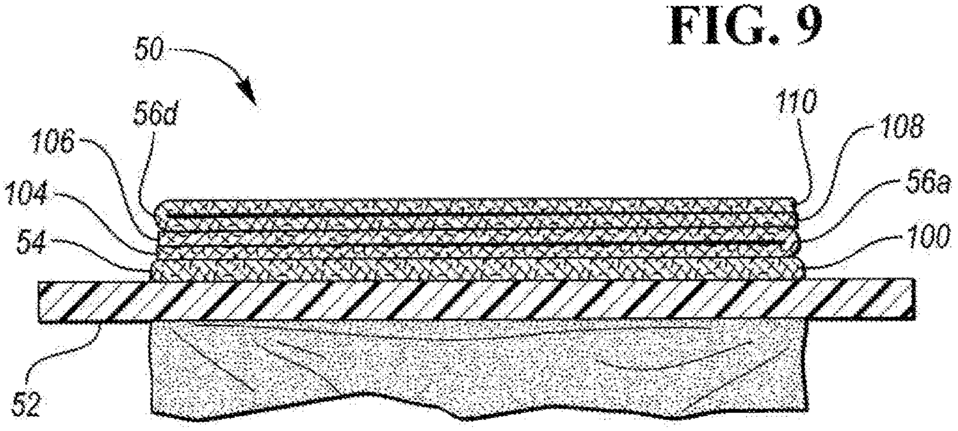
FIG. 10 is a cross sectional view taken along the line 10-10 of FIG. 9.

Referring to FIG. 10, a cross section of the assembled buckle housing trim assembly 50 proximate an inner peripheral edge (e.g., edge 66*a*) of the inner aperture 70, the trim wall 54 and one or more trim covers 56 may define a trim layer stack. For example, the trim wall 54 may define a first trim layer 100 that may be in engagement (e.g., direct engagement) with the retaining frame 52. A first trim cover (e.g., trim cover 56*a*) may define a second trim layer 102 104 that may be disposed in engagement (e.g., direct engagement) with the first trim layer 100, and a third trim layer 106. A second trim cover (e.g., trim cover 56*d*) may define a fourth trim layer 108 that may be in engagement (e.g., direct engagement) with the third trim layer, and a fifth trim layer 110.

In at least one approach, to secure the buckle housing trim assembly 50 to the seat bottom 14, the retaining frame 52 may be deformed (e.g., bent or folded) and inserted into the seat belt buckle housing 30 at the upper surface 20. The retaining frame 52 may further be directed through the seat belt buckle housing 30 such that the trim walls 54 are disposed parallel to the seat belt buckle housing 30. When the retaining frame 52 extends past the bottom surface 14, the retaining frame 52 may reassume its previous (e.g., non-deformed) configuration. In this configuration, the trim covers 56 may extend orthogonal (e.g., 90°) or substantially orthogonal (e.g., 90°+/−5°) to the trim walls 54. As shown in FIGS. 2 and 3, the seat belt buckle 32 may extends through the inner aperture 70 and may engage at least one trim cover 56. In at least one approach, the seat belt buckle 32 may engage at least four trim covers 56. As discussed, the trim covers 56 may be triangular trim covers. In this way, the seat belt buckle 32 may engage the trim covers 56 at hypotenuse edges 84 of the triangular trim covers 56.

In use, the trim covers 56 may cooperate to substantially cover the seat belt buckle housing 30 at the lower surface 22 of the seat bottom 14. More particularly, the trim covers 56 may substantially surround and may engage the seat belt buckle 32 (e.g., at a shaft portion of the seat belt buckle 32) as the seat belt buckle 32 is moved within the seat belt buckle housing 30, as shown in FIGS. 2 and 3. For example, a first pair of trim covers 56 may flex (e.g., bunch) when the seat belt buckle 32 is moved to the position of FIG. 2, and an opposing second pair of trim covers 56 may extend to the seat belt buckle 32 (e.g., into engagement with the seat belt buckle 32). When the seat belt buckle 32 is moved to the position of FIG. 3, the second pair of trim covers 56 may flex (e.g., bunch), and the first pair of trim covers 56 may extend to the seat belt buckle 32 (e.g., into engagement with the seat belt buckle 32).

In this way, the trim covers 56 may cooperate to visually conceal undercarriage components of the seat assembly 10, such as the frame 34. The trim covers 56 may further cooperate to inhibit debris from falling to the undercarriage components of the seat assembly 10.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined at further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A seat belt buckle housing trim assembly comprising:
- a retaining frame having an attachment surface that extends about an inner aperture;
- at least one trim wall secured to the attachment surface and extending through the inner aperture; and
- a plurality of trim covers secured to the attachment surface and extending across at least a portion of the inner aperture.

2. The seat belt buckle housing trim assembly of claim 1 wherein each of the plurality of trim covers is a triangular trim cover.

3. The seat belt buckle housing trim assembly of claim 2 wherein one of the triangular trim covers has two edges that are secured to the retaining frame, and a hypotenuse edge that extends across the inner aperture.

4. The seat belt buckle housing trim assembly of claim 2 wherein the triangular trim covers are scalene right triangles.

5. The seat belt buckle housing trim assembly of claim 1 wherein the plurality of trim covers comprises a trim cover having a first edge secured adjacent to a first inner aperture wall, a second edge secured adjacent to a second inner aperture wall, and a third edge of the cover that extends across the inner aperture.

6. The seat belt buckle housing trim assembly of claim 1 wherein the plurality of trim covers comprises an individual trim cover that extends across at least a portion of at least one adjacent trim cover.

7. The seat belt buckle housing trim assembly of claim 6 wherein the individual trim cover extends across at least a portion of at least two adjacent trim covers of the plurality of trim covers.

8. The seat belt buckle housing trim assembly of claim 7 wherein the at least two adjacent trim covers comprise a first adjacent trim cover and a second adjacent trim cover, and wherein the individual trim cover overlaps the first adjacent trim cover at a first side, and is overlapped by the second adjacent trim cover at a second side opposite the first side.

9. The seat belt buckle housing trim assembly of claim 1 wherein the plurality of trim covers includes four triangular trim covers, and wherein each of the four triangular trim covers extends across at least a portion of at least two adjacent triangular trim covers.

10. The seat belt buckle housing trim assembly of claim 1 wherein each of the plurality of trim covers is formed of a flexible fabric.

11. The seat belt buckle housing trim assembly of claim 1 wherein the plurality of trim covers comprises a folded trim cover that includes a first set of adjacent sides having a first length and a second set of adjacent sides having a second length greater than the first length.

12. The seat belt buckle housing trim assembly of claim 11 wherein a first seam secures the first set of adjacent sides together, and wherein a second seam secures the second set of adjacent sides together.

13. The seat belt buckle housing trim assembly of claim 1 wherein proximate an inner peripheral edge of the inner aperture, a trim wall of the at least one trim wall defines a first trim layer in engagement with the retaining frame, a first trim cover of the plurality of trim covers defines a second trim layer in engagement with the first trim layer and a third trim layer, and a second trim cover of the plurality of trim covers defines a fourth trim layer in engagement with the third trim layer and a fifth trim layer.

14. A seating assembly for a vehicle, comprising:
- a seat bottom including a lower surface, an upper surface, and a seat belt buckle housing extending from the lower surface to the upper surface;
- a seat belt buckle extending within the seat belt buckle housing;
- a buckle housing trim assembly that includes
  - a retaining frame disposed at the lower surface and defining an inner aperture;
  - at least one trim wall secured to an attachment surface of the retaining frame and extending from the retaining frame, through the seat belt buckle housing and the inner aperture, and to the upper surface; and a plurality of trim covers secured to the attachment surface of the retaining frame and extending across at least a portion of the inner aperture.

15. The seating assembly of claim 14 wherein the at least one trim wall extends through the seat belt buckle housing in a first direction, and wherein the plurality of trim covers includes a trim cover that extends across the inner aperture in a second direction substantially orthogonal to the first direction.

16. The seating assembly of claim 14 wherein the seat belt buckle extends through the inner aperture and engages a trim cover of the plurality of trim covers.

17. The seating assembly of claim 14 wherein the plurality of trim covers includes at least four trim covers secured to the retaining frame and extending across at least a portion of the inner aperture.

18. The seating assembly of claim 17 wherein the seat belt buckle extends through the inner aperture and engages the at least four trim covers.

19. The seating assembly of claim 18 wherein the at least four trim covers are triangular trim covers, and wherein the seat belt buckle engages the at least four trim covers at hypotenuse edges of the triangular trim covers.

20. A method of assembling a seat belt buckle housing trim assembly comprising:

securing at least one trim wall to an attachment surface of a retaining frame having a plurality of inner edges defining an inner aperture;

securing a first trim cover to the retaining frame at a first inner edge and at a second inner edge adjacent to the first inner edge;

securing a second trim cover to the retaining frame at the second inner edge and at a third inner edge adjacent to the second inner edge to at least partially overlap the first trim cover;

securing a third trim cover to the retaining frame at the third inner edge and at a fourth inner edge adjacent to the third inner edge to at least partially overlap the second trim cover; and securing a fourth trim cover to the retaining frame at the fourth inner edge and at the first inner edge to at least partially overlap the third trim cover and the first trim cover;

wherein the at least one trim wall extends through the inner aperture, and the trim covers extend across at least a portion of the inner aperture.

* * * * *